Patented Feb. 17, 1942

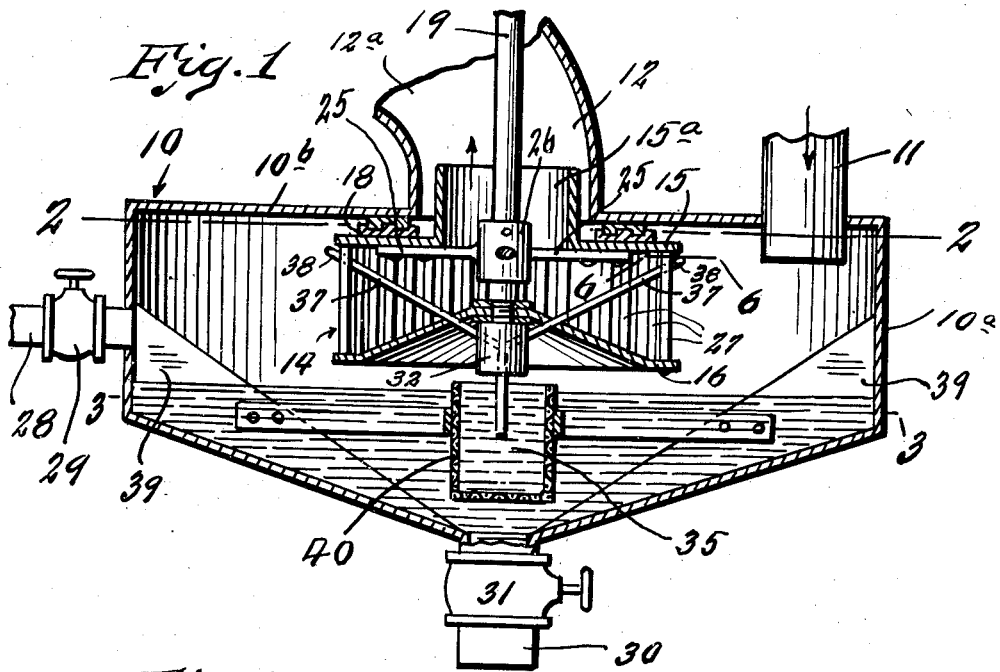
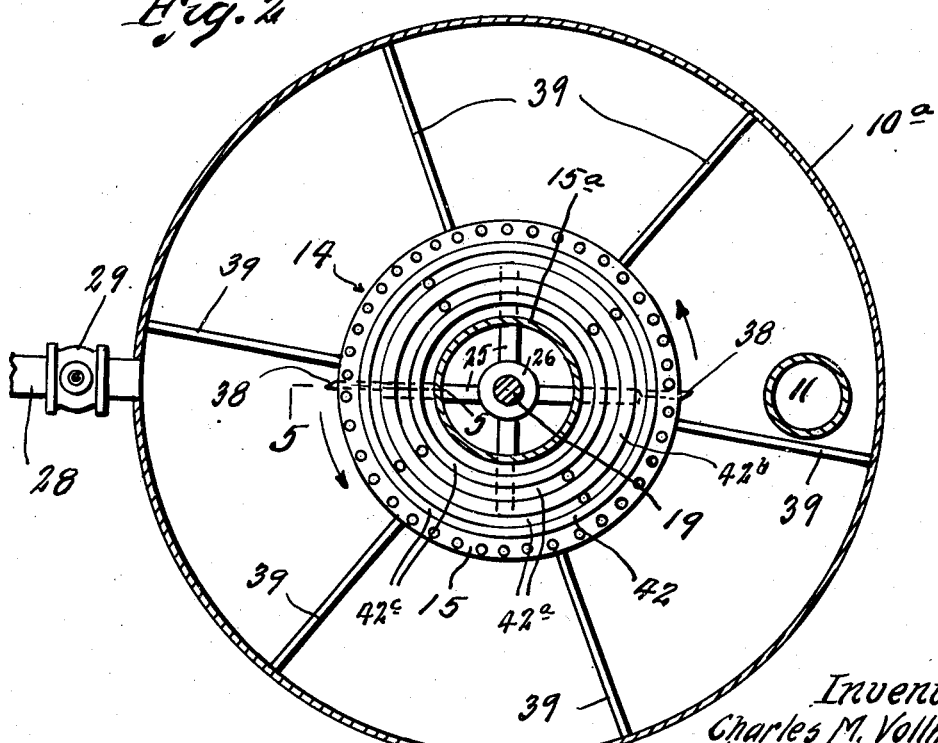

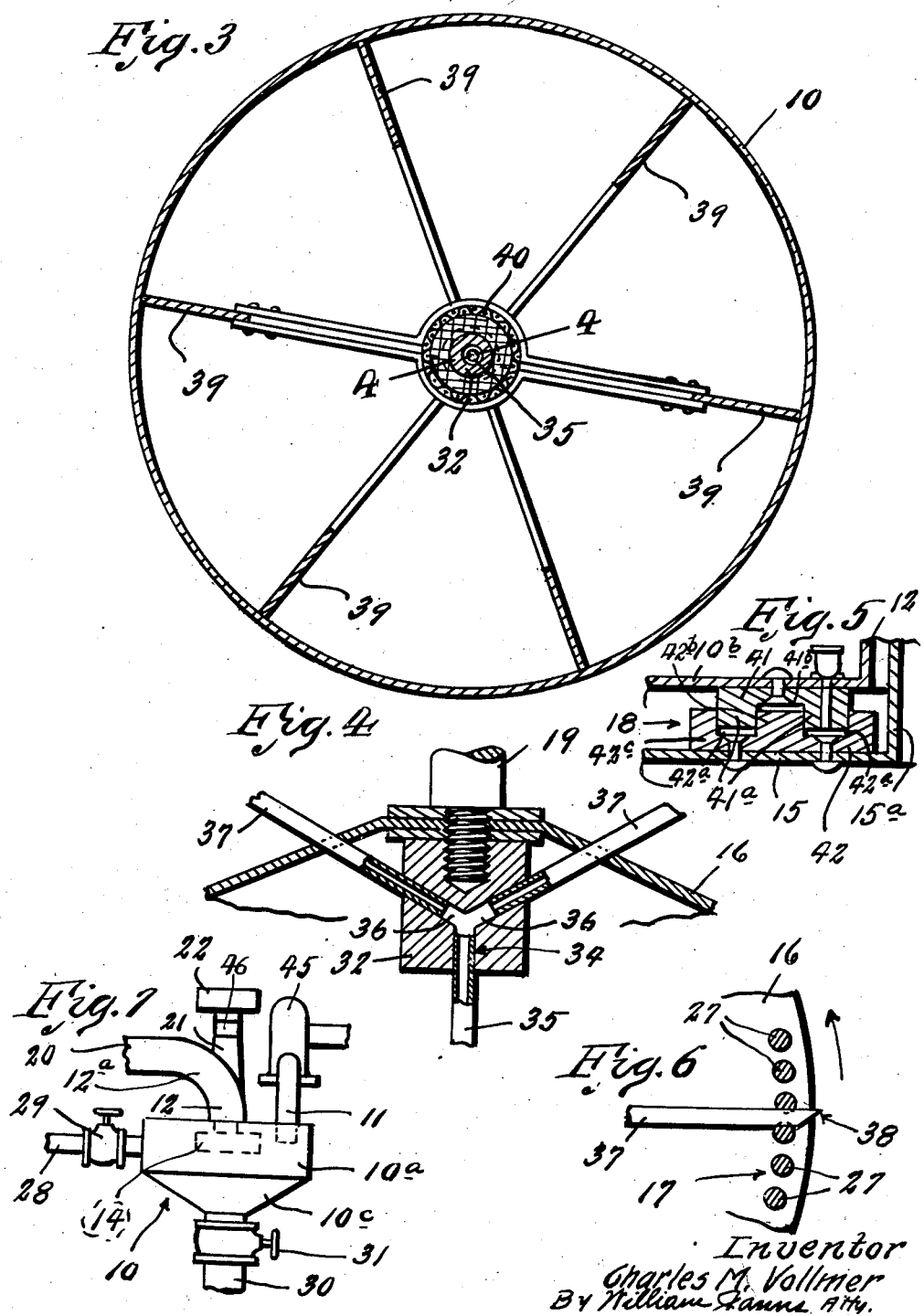

2,273,341

UNITED STATES PATENT OFFICE 2,273,341

DUST COLLECTOR

Charles M. Vollmer, St. Louis, Mo.

Application April 5, 1940, Serial No. 327,953

6 Claims. (Cl. 183—26)

This invention relates to fly ash collectors or dust separators, and is an improvement upon the invention disclosed in my copending application filed July 29, 1939, Serial Number 287,356.

Among the main objects of the invention is to provide an apparatus wherein the fly ash or dust is separated from the air by a rotary cage deflector and is collected in the lower end of the apparatus which contains water while the air is discharged outwardly through the upper end of said apparatus.

Another object of the invention is to provide a dust collector or separator comprising a casing having an inlet and an outlet, the latter being arranged axially in the upper end of said casing, and a cylindrical cage revolubly mounted in said casing coaxially with said outlet, and having its upper end provided with an extension projecting into said outlet for discharging purified air thereinto, said cage having its peripheral wall formed by a plurality of vertically disposed spaced-apart rods forming a plurality of openings through which air passes into said cage, while the dust particles are engaged by said rods and are thrown outwardly by said rods.

Another object of the invention is the provision of a casing having an air outlet extending axially from the upper end thereof and having its lower end filled with water, and a cylindrical cage revolubly mounted in said casing above the level of said water and having its upper end communicating with said casing outlet, the periphera wall of said cage being provided with a pluralit of vertically disposed elongated openings through which air passes into said cage, while the dust particles are thrown outwardly by the impact with the solid portions of said wall, there being a tube extending axially downward from said cage into said water, the upper end of said tube terminating in two branches extending diagonally upward in said cage and through said peripheral wall at diametrically opposed points, whereby the rotation of said cage causes water to be sprayed from said branches into the upper end of said casing.

With these and other objects in view, my invention consists in certain novel features of construction and arrangement of parts, hereinafter more fully described and claimed, and illustrated in the accompanying drawings, in which—

Figure 1 is a vertical cross section through my dust collector.

Figure 2 is a horizontal cross section taken on line 2—2 of Figure 1.

Figure 3 is a horizontal cross section taken on line 3—3 of Figure 1.

Figure 4 is an enlarged vertical cross section taken on line 4—4 of Figure 3.

Figure 5 is an enlarged vertical cross section taken on line 5—5 of Figure 2.

Figure 6 is an enlarged detail cross section taken on line 6—6 of Figure 1.

Figure 7 is a reduced side elevation showing one form of drive for the centrifugal drum.

Referring by numerals to the accompanying drawings, 10 indicates a stationary casing having an air inlet 11 and an air outlet 12. This casing is preferably of cylindrical shape having a peripheral wall 10a, a flat top wall 10b, and an inverted cone-shaped bottom wall 10c. The air inlet 11 is located in the top wall 10b near the peripheral wall 10a and extends a suitable distance into said casing. The air outlet 12 is disposed coaxially with said casing and is preferably of larger diameter than said inlet 11.

A cage or centrifugal separator 14 is disposed in said casing below said outlet and is substantially of larger diameter than the latter so as to overlap the same for a suitable distance. This cage consists of a top wall 15, a bottom wall 16, and a peripheral wall 17. The top wall 15 has a tubular upward extension 15a which projects into said air outlet 12. Preferably, a dust seal 18 is provided between the opposed faces of said top wall 10b and said top wall 15 to prevent dust laden air from escaping therebetween into said outlet 12.

The bottom wall 16 of cage 14 is preferably cone-shaped to form said wall sloping outwardly from the center. Fixed to this bottom wall is the lower end of a vertically disposed revoluble shaft 19. The upper end of outlet 12 is curved, as indicated at 12a, to connect with a horizontally disposed conduit 20. The shaft 19 extends upwardly and outwardly through said curved end 12a and has a bearing 21 (Fig. 7) therein. A pulley 22 is fixed to the upper end of shaft 19. Preferably, the top wall 15 is connected to the shaft, by means of a plurality of arms 25, extending radially from the hub 26 fixed to said shaft 19.

The peripheral wall 17 consists of a plurality of vertically disposed spaced-apart members 27, the lower ends of which are fixed to the rim of bottom wall 16 and the upper ends of which are fixed to the rim of the top wall 15. Members 27 are in the instant case in the shape of rods of a given diameter and are spaced from each other a suitable distance in a definite relation with the speed at which the cage is operated.

The lower portion of the casing 10 below the lower end of cage 14 is filled with water which is admitted thereinto through a water inlet 28 having a shut-off valve 29. The inverted cone-shaped bottom member 10c terminates in an outlet 30 provided with a valve 31.

The lower end of shaft 19 is screw-threaded and extends a suitable distance below the bottom wall 16. Screw-seated on this projecting end is the upper end of a fitting 32. The lower half of this fitting is formed with a downwardly opening axial bore 34 and secured in this bore is the upper end of a tube 35. This tube extends downwardly a suitable distance into the water contained in casing 10. Extending diagonally outward from bore 34 are two diametrically opposed bores 36 in which are fixed the inner ends of tubes 37. The outer ends of these extend a slight distance beyond the rods 27. As the outside diameter of each tube is larger than the distance between two adjacent rods 27, the latter are cut away at points where each tube 37 projects outwardly.

The outer end of each tube 37 is cut obliquely, as indicated at 38, so as to present the oval-shaped opening to the rear of the direction of rotation. Thus as the cage or drum 17 is rotated, suction is produced in tubes 37 and water is drawn upwardly through tube 35 and discharged within the upper half of the casing in a spray through the discharge ends 38 of tubes 37. The mist or fine spray thus created helps to separate dust particles, fly ash, and other particles from the air, and only purified air enters the cage 17. The high rotation of tube 35 has a tendency to set the water in circular motion. The centrifugal force would cause the water to move outwardly against the peripheral wall 10a and interfere with the efficient operation of the device. Thus the casing would be subjected to undesirable vibration and the wall 10a placed under heavy strain by the volume of water forced thereagainst. Also sufficient water might move outwardly from the center of the casing to leave the lower end of the pipe 35 dry.

In order to hold this water stationary a plurality of baffle plates 39 are arranged radially in the lower end of said casing so that the circular motion of the water is checked.

Preferably, a cylindrical screen 40, closed at its lower end and of suitable mesh, is supported in said casing in spaced relation with tube 35. The upper end of this screen member extends a suitable distance above the level of the water. The purpose of this screen is to prevent foreign particles contained in the water from clogging said tube.

The seal 18 consists of a ring 41 (Fig. 5), fixed to the underside of top plate 10b and provided with a pair of concentric ribs 41a and a groove 41b and a ring 42 fixed to the top wall 15 and provided with a plurality of concentric grooves 42a for receiving ribs 41a and a central rib 42b engaging groove 41b and external shoulders 42c for overlapping the edges of ring 41.

In the operation of the apparatus, the cage 14 is driven at a suitable speed. The dust laden air is forced into the casing 10 through the inlet pipe 11. The air in the casing enters, through the spaces between rods or members 27, said cage 14 and thence travels upwardly into the outlet 12. However, the dust particles carried by the air impinge against and are engaged by the rapidly moving rods 27 which throw said dust particles outwardly against the peripheral wall of the casing. These dust particles upon striking the peripheral wall of the casing drop into the water contained in the lower end thereof. This water can be periodically discharged from the casing by means of the valve 31.

The valve 31 is sufficiently large so that the water can be discharged quickly without stopping the operation of the apparatus. Thus the water acts as a collecting medium to settle the dust in the casing and also serves as a cleaning agent for quickly removing the dust from the casing without interfering with the operation of the device.

The bars or members 27 are round in cross section, as I found by experiments that this form is the most efficient. The diameters of the rods and the spacing thereof from each other controls the degree of fineness of the material separated from the air. The bottom of the cage slopes outwardly to assist in the proper functioning of the device. If desired, a bearing 44 for shaft 19 can be placed in outlet 12 above extensions 15a. The dust and air is forced into the separator through the inlet 11 in any suitable manner, such as a blower 45. The purified air or gas is discharged to atmosphere through the outlet 12.

The separator can be used for separating dust, fly ash and other fine material from air and other gaseous fluids.

The separation is effected mechanically by the deflection produced by the rotation of the cage. As the air or other gas is forced into the casing it escapes into the cage through the spaces formed by the bars 27 and then travels upwardly into the outlet 12. The dust particles are engaged by members 27 of cage 14 and are thrown radially outward by the impact and drop into the water contained in the lower end of said casing. An end thrust bearing 46 can be placed on shaft 19 above bearing 21.

The high speed at which the cage 14 and pipe 35 rotate, and the disposal of the nozzle 39 rearwardly of the direction of rotation creates suction in pipes or tubes 37 which causes water to be drawn upwardly through tube 35 and discharged from said nozzles in a fine mist or spray into said casing. This moisture collects on the dust particles carried by the air in said casing and helps in separating said particles from the air. Thus no priming is necessary and the water is discharged through nozzles 38 as soon as the device reaches a definite speed.

The water contained in the lower end of the casing is not agitated. The level of the water is below said cage 14 and below the lower end of fitting 32 and only tube 35 extends into the water. As this tube is of a very small diameter its rotation does not disturb the water. The screen 40 tends to check any rotary motion of the water which might be induced by said tube 35. The plates 39 prevent agitation or motion of the water due to vibration or air currents. The dust and particles of material separated from the air collect in the water and settle in the lower end of the casing from which they are removed by opening valve 31. The screen 40 prevents the dust and mud from settling in the vicinity of the inlet end of tube 35 so that the latter is not clogged up by the sediment.

In my improved separator the dust or other particles of material are separated from the air by the impact of said particles against the bars 27 of cage 14 and also by the discharge of moisture in said casing.

My device is of simple construction, economical in operation, and highly efficient in performing its intended functions.

While I have shown and described herein the preferred form of my separator, it will be understood that various changes may be made in the construction and arrangement of parts of my separator without departing from the spirit of my invention.

I claim:

1. In a dust separator of the class described, the combination of a vertical casing having its lower part filled with water, a dust and air conduit opening into the upper end thereof, a blower in said conduit, a tubular air outlet extending upwardly from the upper end of said casing, a cage revolubly mounted in said casing coaxially with said outlet and having a top wall formed with a tubular axial extension projecting into said outlet, said cage having a closed bottom wall, a plurality of spaced-apart rods extending vertically between said walls and having their ends secured thereto, said rods forming a peripheral wall of said cage, whereby air is admitted into said cage through the spaces between said rods while dust particles are thrown outward by the impact with said rods, a tubular member extending coaxially downward from said cage into said water, and a plurality of tubes connected to the upper end of said tubular member and extending radially outward from said cage and having their discharge ends presented rearward to the direction of rotation for spraying said water into the upper end of said casing.

2. In a dust separator of the class described, the combination of a vertical casing having its lower end filled with water, a dust and air conduit opening into the upper end of said casing, means in said conduit for forcing air and dust into said casing, a tubular air outlet extending upward from the upper end of said casing, a cage revolubly mounted in said casing coaxially with said outlet and having a top wall formed with a tubular extension projecting into said outlet, said cage having a closed bottom wall disposed above the level of said water, a plurality of spaced-apart rods extending vertically between said walls and having their ends secured thereto, said rods forming the peripheral wall of said cage, whereby air is admitted into said cage through the spaces between said rods, while dust particles are thrown outwardly by the impact with said rods, a tubular member extending coaxially downward from said cage into said water, a pair of diametrically disposed tubes connected to the upper end of said tubular member and extending radially outward from said cage, each tube having its outer end disposed obliquely and rearwardly to the direction of rotation to create suction in said tubes and said tubular member and spray said water into the upper end of said casing, and a screen arranged in the water in said casing in spaced relation with the lower end of said tubular member, said screen having an open upper end extending above the level of said water, whereby material collected in said water is prevented from entering said tubular member.

3. In a dust separator of the class described, the combination of a vertical casing having a tapered lower end adapted to contain water, a discharge connection in said lower end, a dust and air conduit opening into the upper end of said casing, an air outlet extending upward from the upper end of said casing, a cage revolubly mounted in said casing coaxially with said outlet and having a top wall formed with a tubular extension projecting into said outlet, said cage having a closed bottom wall disposed above the level of the water in said casing, a plurality of spaced-apart rods extending longitudinally between said walls and having their ends secured thereto, said rods forming a peripheral wall of said cage whereby air is admitted into said cage through the spaces between said rods while dust particles are thrown outward in said casing by the impact against said rods, a plurality of tubes arranged radially outward in said cage and having their discharge ends opening rearward of the direction of rotation to produce suction in said tubes, a tubular member extending coaxially downward from said cage into the water in said casing and having its upper end connected to the inner ends of said tubes, whereby water is sucked into said tubular member and tubes and is discharged by centrifugal action into the upper end of said casing, and a plurality of baffle walls arranged radially in the lower end of said casing for preventing agitation of said water.

4. In a dust separator of the class described, the combination of a vertical casing having a tapered lower end adapted to contain water, a discharge connection in said lower end, a dust and air conduit opening into the upper end of said casing, an air outlet extending upward from the upper end of said casing, a cage revolubly mounted in said casing coaxially with said outlet and having a top wall formed with a tubular extension projecting into said outlet, said cage having a closed bottom wall disposed above the water level of said casing, a plurality of spaced-apart rods extending between said walls and having their ends secured thereto, said rods forming a peripheral wall of said cage, whereby air is admitted into said cage through the spaces between said rods, while dust particles are thrown outward in said casing by the impact against said rods, a plurality of tubes arranged radially outward in said cage and having their discharge ends opening rearward of the direction of rotation to produce suction in said tubes, a tubular member extending coaxially downward from said cage into the water in said casing and having its upper end connected to the inner ends of said tubes, whereby water is sucked into said tubular member and said tubes and is discharged by centrifugal action into the upper end of said casing, a plurality of baffle walls arranged in the lower end of said casing for preventing agitation of water contained therein, a screen arranged in said water in spaced relation with the lower end of said tubular member and extending above the level of said water, and means for supporting said screen on said baffle walls.

5. A fly ash and dust separator comprising a vertically disposed casing having a lower end containing water, an air discharge conduit leading upward from the upper end of said casing, a fly ash and dust and air delivery conduit opening into the upper end of said casing, a cage revolubly mounted in said casing above the level of said water and having a closed bottom wall and having its top wall formed with a tubular extension disposed axially in said air discharge conduit, a plurality of rods extending between and having their ends fixed to said top and bottom walls to form a peripheral wall for said cage, said rods being spaced from each other to provide air inlets into said cage, a plurality of tubes carried by said cage and extending radially outward into said casing, a pipe extending axially downward from said cage and having its upper end connected to the inner ends of said tubes and having its lower end disposed in the water in the lower end of said casing, whereby water is sucked upward in said pipe and is discharged by centrifugal action from said tubes into the upper end of said casing, and means creating pressure in said delivery conduit for forcing fly ash, dust and air into said casing, thereby causing the air to flow through said inlets into said cage and thence into said air discharge conduit, while the fly ash and dust particles are saturated with the sprayed water and are deflected away from said cage by the impact against said rods and drop into said water in said casing.

6. A fly ash and dust separator comprising a vertically disposed casing having its lower end containing water, an air discharge conduit leading upward from the upper end of said casing, a fly ash, dust and air delivery conduit opening into the upper end of said casing, a cage revolubly mounted in said casing above the level of said water and having a closed bottom wall and having its top wall formed with a central opening, a tubular axial connection between said central opening and said air discharge conduit, a peripheral wall for said cage comprising a plurality of vertically disposed solid sections fixed to said top and bottom walls and spaced from each other to provide a plurality of vertically disposed air inlets into said cage, a plurality of tubes carried by said cage and extending radially outward therefrom and having their discharge openings presented rearwardly of the line of rotation to produce suction in said tubes, a pipe extending axially downward from said cage and having its upper end connected to the inner ends of said tubes, and having its lower end disposed in the water contained in said casing, whereby water is sucked upward in said pipe and is discharged by centrifugal action from said tubes into the upper end of said casing, and means in said delivery conduit for forcing air and dust and fly ash carried thereby under pressure into said casing, whereby the latter is maintained under greater pressure than said cage and air discharge conduit, thereby causing air to flow through said inlets into said cage and thence into said air discharge conduit, while the dust and fly ash particles saturated with the sprayed water are thrown from said cage by the impact with said sections of said peripheral wall.

CHARLES M. VOLLMER.